(12) United States Patent
Zhang et al.

(10) Patent No.: US 11,272,454 B1
(45) Date of Patent: Mar. 8, 2022

(54) SYSTEMS AND METHODS FOR WAKING UP A TRANSCEIVER FOR WIRELESS COMMUNICATIONS

(71) Applicant: Verily Life Sciences LLC, South San Francisco, CA (US)

(72) Inventors: Tong Zhang, San Mateo, CA (US); Grant Anderson, Hayward, CA (US); Grant Smith, Alameda, CA (US); Robert Wiser, San Francisco, CA (US)

(73) Assignee: VERILY LIFE SCIENCES LLC, South San Francisco, CA (US)

( * ) Notice: Subject to any disclaimer, the term of this patent is extended or adjusted under 35 U.S.C. 154(b) by 57 days.

(21) Appl. No.: 16/803,204

(22) Filed: Feb. 27, 2020

Related U.S. Application Data

(60) Provisional application No. 62/811,833, filed on Feb. 28, 2019.

(51) Int. Cl.
*H04W 52/02* (2009.01)

(52) U.S. Cl.
CPC .............................. *H04W 52/0229* (2013.01)

(58) Field of Classification Search
CPC .......... H04W 52/0235; H04W 52/0229; Y02D 30/70
See application file for complete search history.

(56) References Cited

U.S. PATENT DOCUMENTS

| | | | |
|---|---|---|---|
| 5,471,212 A | 11/1995 | Sharpe et al. | |
| 5,790,946 A | 8/1998 | Rotzoll | |
| 7,103,344 B2 | 9/2006 | Menard | |
| 2006/0274698 A1 | 12/2006 | Twitchell, Jr. | |
| 2009/0129306 A1 | 5/2009 | Twitchell, Jr. et al. | |
| 2009/0275338 A1* | 11/2009 | Twitchell, Jr. | H04W 36/18 455/442 |
| 2013/0072256 A1* | 3/2013 | Su | H04W 52/0274 455/558 |
| 2014/0254466 A1 | 9/2014 | Wurster et al. | |
| 2018/0041959 A1* | 2/2018 | Yang | H04W 52/0216 |
| 2021/0084711 A1* | 3/2021 | Park | H04W 76/15 |

OTHER PUBLICATIONS

Demirkol et al., Wake-up Receivers for Wireless Sensor Networks: Benefits and Challenges, IEEE Wireless Communications, vol. 16, No. 4, Oct. 9, 2009, 8 pages.
Pletcher et al., Ultra-Low Power Wake-Up Receivers for Wireless Sensor Networks, Technical Report No. UCB/EECS-2008-59, Available Online At: http://www.eecs.berkeley.edu/Pubs/TechRpts/2008/EECS-2008-59.html, May 20, 2008, 164 pages.

* cited by examiner

*Primary Examiner* — Marcos L Torres
(74) *Attorney, Agent, or Firm* — Kilpatrick Townsend & Stockton LLP

(57) ABSTRACT

One illustrative example includes wireless device having a first wake-up receiver and a second wake-up receiver. The first wake-up receiver can detect a first wake-up signal within a first group of wireless signals and responsively activate the second wake-up receiver. The second wake-up receiver can then detect a second wake-up signal within a second group of wireless signals and responsively activate a transceiver, where the transceiver is usable to engage in bidirectional communication with a remote device.

29 Claims, 9 Drawing Sheets

SYSTEMS AND METHODS FOR WAKING UP A TRANSCEIVER FOR WIRELESS COMMUNICATIONS

CROSS-REFERENCE TO RELATED APPLICATIONS

This application claims priority to U.S. Provisional Patent Application No. 62/811,833, titled "Systems And Methods For Waking Up A Transceiver For Wireless Communications," filed Feb. 28, 2019, the entirety of which is hereby incorporated by reference.

TECHNICAL FIELD

The present disclosure relates generally to wireless communications. More specifically, but not by way of limitation, this disclosure relates to waking up a transceiver for wireless communications.

BACKGROUND

A fundamental tradeoff between power consumption and latency exists in wireless communication systems. For example, in order for a transceiver to respond to wireless communications quickly to minimize latency, the transceiver must always be listening for the wireless communications. But transceivers are often higher-power devices (e.g., on the order of milliamps), and having a transceiver turned on and listening all the time can waste significant amounts of power, especially in situations where wireless communications are infrequent. And while reducing the amount of time that a transceiver is listening for wireless communications can save power, this comes at the expense of missing potentially important wireless communications.

SUMMARY

One example of the present disclosure includes a system comprising a first wake-up receiver. The first wake-up receiver is configured to receive a first plurality of wireless signals, detect a first wake-up signal among the first plurality of wireless signals, and in response to detecting the first wake-up signal among the first plurality of wireless signals, transmit a first activation signal configured to cause a second wake-up receiver to become activated. The system also comprises the second wake-up receiver. The second wake-up receiver is configured to switch from a deactivated state to an activated state as a result of the first wake-up transceiver transmitting the first activation signal and responsively: receive a second plurality of wireless signals, detect a second wake-up signal among the second plurality of wireless signals, and in response to detecting the second wake-up signal among the second plurality of wireless signals, transmit a second activation signal configured to cause a transceiver to become activated. The system also comprises the transceiver. The transceiver is configured to switch from a deactivated state to an activated state as a result of the second wake-up receiver transmitting the second activation signal and responsively engage in bidirectional communications with a remote device.

Another example of the present disclosure includes a wireless device comprising a first wake-up receiver. The first wake-up receiver is configured to detect a first wake-up signal within a first plurality of wireless signals, and in response to detecting the first wake-up signal among the first plurality of wireless signals, transmit a first activation signal configured to cause a second wake-up receiver to become activated. The wireless device also comprises the second wake-up receiver. The second wake-up receiver is configured to detect a second wake-up signal within a second plurality of wireless signals, and in response to detecting the second wake-up signal among the second plurality of wireless signals, transmit a second activation signal configured to cause a transceiver to become activated.

Still another example of the present disclosure includes a method comprising detecting a first wake-up signal using a first wake-up receiver of a wireless device. The method also comprises, in response to detecting the first wake-up signal, activating a second wake-up receiver of the wireless device. The method also comprises, subsequent to activating the second wake-up receiver of the wireless device: detecting a second wake-up signal using the second wake-up receiver; and in response to detecting the second wake-up signal, activating a transceiver of the wireless device, wherein the transceiver is configured to engage in bidirectional communication with a remote device. Some or all of these steps can be implemented by the wireless device.

Yet another example of the present disclosure includes a non-transitory computer-readable medium comprising program code that is executable by a processing device of a wireless device. The program code can cause the processing device to receive, from a first wake-up receiver of the wireless device, a first activation signal indicating that the first wake-up receiver has received a first wake-up signal. The program code can cause the processing device to, in response to receiving the first activation signal, activate a second wake-up receiver of the wireless device. The program code can cause the processing device to, subsequent to activating the second wake-up receiver: receive, from the second wake-up receiver, a second activation signal indicating that the second wake-up receiver has received a second wake-up; and in response to receiving the second activation signal, activate a transceiver configured to engage in bidirectional communication with a remote device.

Another example of the present disclosure includes a wireless device comprising a transceiver configured to engage in bidirectional communications with a remote device. The wireless device also comprises a wake-up receiver. The wake-up receiver is configured to detect a wake-up signal within a plurality of wireless signals, wherein the wake-up signal includes a Bluetooth advertisement signal; and in response to detecting the wake-up signal among the plurality of wireless signals, transmit an activation signal configured to cause the transceiver to become activated.

Still another example of the present disclosure includes a method comprising detecting a wake-up signal within a plurality of wireless signals using a wake-up receiver of the wireless device, wherein the wake-up signal includes a Bluetooth advertisement signal. The method also comprises, in response to detecting the wake-up signal among the plurality of wireless signals, transmitting an activation signal configured to cause a transceiver to become activated. Some or all of these steps can be implemented by the wireless device.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

DETAILED DESCRIPTION

Figure 1:
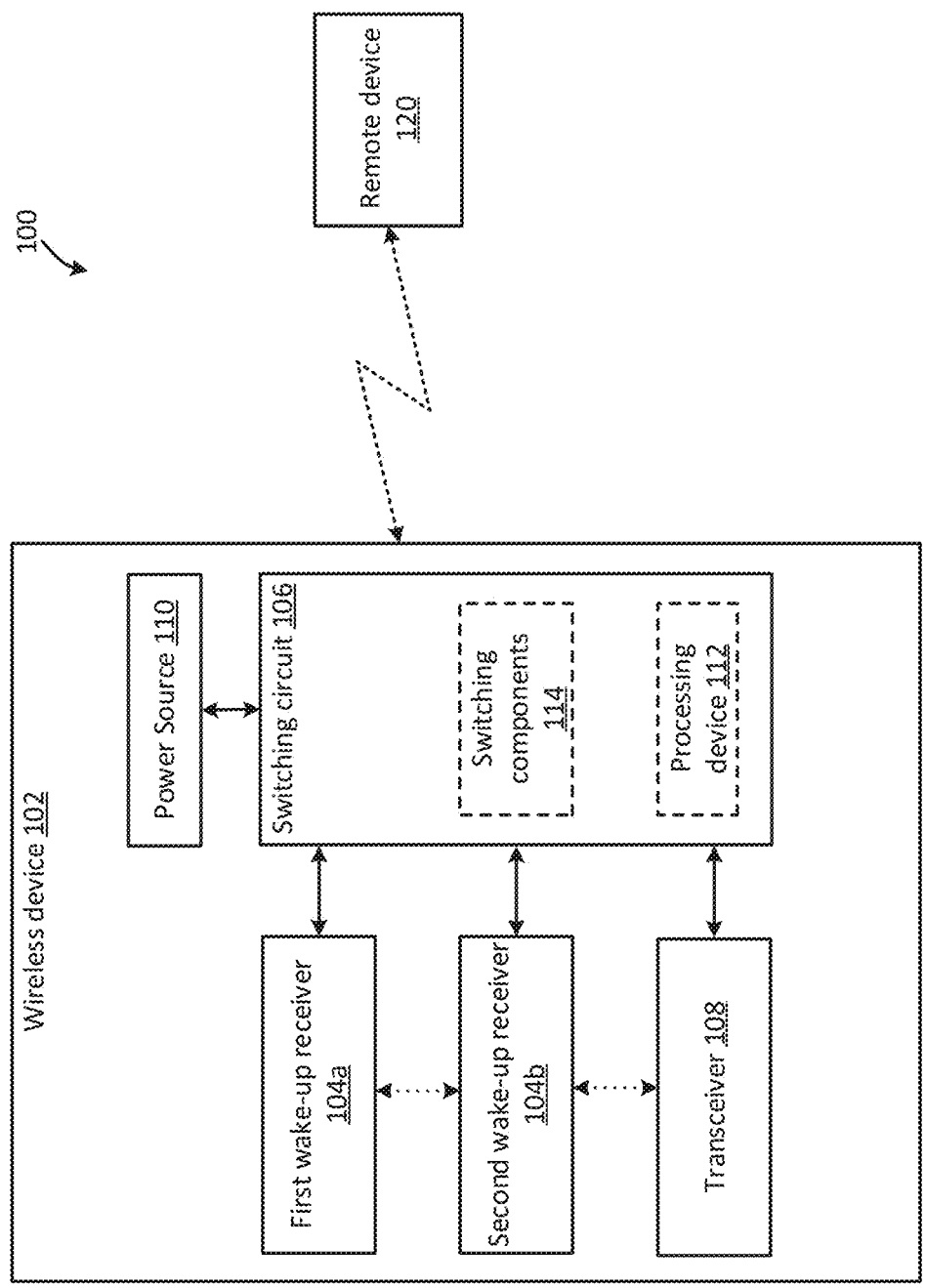
FIG. 1 is a block diagram of an example of a system for waking up a transceiver according to some aspects.

Reference will now be made in detail to various and alternative illustrative examples and to the accompanying drawings. Each example is provided by way of explanation and not as a limitation. It will be apparent to those skilled in the art that modifications and variations may be made. For instance, features illustrated or described as part of one example may be used in another example to yield a still further example. Thus, it is intended that this disclosure includes modifications and variations as come within the scope of the appended claims and their equivalents.

As used herein, the terms "a," "an," and "the" can refer to one or more unless specifically noted otherwise. And the term "or" is not to be construed as identifying mutually exclusive options. For example, the phrase "X contains A or B" can mean that X contains A and not B, X contains B and not A, or X contains both A and B. That is, the term "or" is used to mean "and/or" unless explicitly indicated to refer to alternatives only or the alternatives are mutually exclusive.

Illustrative Example of Waking Up a Transceiver for Wireless Communications

One illustrative example of the present disclosure includes a wireless device able to engage in wireless communications with a remote device, such as a cellphone. The wireless device includes a processing device that is in communication with two discrete wake-up receivers and a transceiver.

The wireless device begins in an initial state in which a first one of the two wake-up receivers is in an activated state (e.g., turned on or in an active listening mode), the second of the two wake-up receivers is in a deactivated state (e.g., turned off or in a sleep mode), and the transceiver is in a deactivated state. While in the activated state, the first wake-up receiver monitors a first wireless channel to listen for and detect a first wake-up signal transmitted by the remote device. One example of the first wake-up signal is a wireless signal with a particular envelope shape. If the first wake-up receiver detects the first wake-up signal, the first wake-up receiver can activate the second wake-up receiver. The second wake-up receiver has greater processing capabilities than the first wake-up receiver, and thus consumes more power than the first wake-up receiver. But the second wake-up receiver still consumes less power than the transceiver does when engaged in wireless communications. Thus, the first wake-up receiver in this example is an ultra-low power wake-up receiver, while the second wake-up receiver is a low-power wake-up receiver, and both wake-up receivers consume less power than the transceiver.

Activating the second wake-up receiver involves causing the second wake-up receiver to switch from a deactivated state to an activated state, which can be done in a variety of ways. In some examples, the first wake-up receiver activates the second wake-up receiver by transmitting a first activation signal (e.g., an interrupt signal) to the processing device. The processing device receives the first activation signal and responsively applies power from a power source to the second wake-up receiver to activate the second wake-up receiver. For instance, the processing device can apply the power to the second wake-up receiver by setting one of its pins to a not-Reset state. In other examples, the first wake-up receiver can activate the second wake-up receiver by transmitting the first activation signal to (e.g., directly to) the second wake-up receiver, such as to a particular pin on the second wake-up receiver, which can activate the second wake-up receiver, such as by enabling a clock.

Once activated, the second wake-up receiver monitors a second wireless channel to detect a second wake-up signal transmitted by the remote device, where the second wireless channel is different from the first wireless channel. One example of the second wake-up signal is a wireless signal carrying particular digital data. The second wake-up receiver can use in-phase and quadrature (I/Q) demodulation to derive digital data from a received wireless signal and then compare that digital data to predefined wake-up content, to determine whether the digital data includes the predefined wake-up content. If the digital data includes the predefined wake-up content, then the second wake-up receiver can determine that the received wireless signal is the second wake-up signal.

If the second wake-up receiver detects the second wake-up signal, the second wake-up receiver then activates the transceiver. As discussed above, the transceiver consumes more power than the second wake-up receiver when active. For example, the transceiver may be able to engage bidirectional wireless communications with the remote device, demodulate digital data received from the remote device, and perform other more complex RF functionality.

In this example, activating the transceiver involves causing the transceiver to switch from a deactivated state to an activated state. The second wake-up receiver can activate the transceiver in a variety of ways, such as by transmitting a second activation signal (e.g., an interrupt signal) to the processing device. The processing device receives the second activation signal and responsively applies power from a power source to the transceiver to activate the transceiver. For instance, the processing device can apply the power to the transceiver by setting one of its pins to a not-Reset state. In other examples, the second wake-up receiver can activate the transceiver by transmitting the second activation signal to (e.g., directly to) the transceiver, such as to a particular pin on the transceiver, which can activate the transceiver.

In the above example, the first and second wake-up receivers work together to wake-up the transceiver only when proper wake-up signals have been received, but to otherwise maintain the transceiver in a deactivated state to avoid unnecessary power consumption. Such a technique may overcome various problems with traditional systems. For example, traditional systems include a single wake-up receiver that is highly sensitive to interference because it monitors a high-traffic wireless channel (e.g., an IEEE 802.11 channel or Bluetooth channel) for a wake-up signal having high-level waveform characteristics that are relatively common, such as a particular pattern of amplitudes. As a result, the wake-up receiver is repeatedly triggered by a large number of "false positives" that wake up a higher-power transceiver unnecessarily.

But in the illustrative example, the first and second wake-up receivers collectively detect multiple wake-up signals transmitted on a combination of wireless channels before activating the transceiver. This can significantly reduce the amount of false positives that unnecessarily activate the transceiver. And by activating the second wake-up receiver only after the first wake-up receiver has detected the first wake-up signal (e.g., as opposed to the having the second wake-up receiver always turned on and listening), the amount of power consumed by the second wake-up receiver is reduced. Further, because the first wake-up receiver is very low power due to the minimal amount of energy required to receive and process the first wake-up signal, the use of a two-stage wake-up receiver cascade can provide significant power savings. Thus, examples according to this disclosure can provide improved power consumption, while retaining high sensitivity to wake-up signals and reducing false positive wake-up detection events.

While the illustrative example involves a first wake-up receiver detecting a first wake-up signal on a first wireless channel and a second wake-up receiver detecting a second wake-up signal on a second wireless channel, any number and combination of wake-up receivers can detect any number and combination of wake-up signals on any number and combination of wireless channels. For instance, in another example, the first wake-up receiver can monitor multiple wireless channels (e.g., Bluetooth channels 37 and 38) for a pattern of wireless signals that collectively form the first wake-up signal. Upon detecting the pattern of wireless signals on the multiple wireless channels, the first wake-up receiver can then activate the second wake-up receiver. Once in the activated state, the second wake-up receiver can monitor yet another wireless channel (e.g., Bluetooth channel 39) for a second wake-up signal. Upon detecting the second wake-up signal, the second wake-up receiver can activate the transceiver.

The description of the illustrative example above is provided merely as an example, not to limit or define the limits of the present subject matter. Various other examples are described herein and variations of such examples would be understood by one of skill in the art. Advantages offered by various examples may be further understood by examining this specification and/or by practicing one or more examples of the claimed subject matter.

Illustrative Systems and Methods for Waking Up A Transceiver

FIG. 1 is a block diagram of an example of a system 100 according to some aspects.

The system 100 includes a wireless device 102, such as an implantable device that can be implanted into a body part (e.g., an arm, leg, back, chest, head, etc.), but could also be a non-implantable device, such as a cellphone, a laptop computer, or a tablet. The wireless device 102 is capable of wirelessly communicating with a remote device 120, such as a cellphone, a laptop computer, or a tablet.

The wireless device 102 can primarily wirelessly communicate with the remote device 120 via a transceiver 108, which can serve as the main communication interface for the wireless device 102. In one example, the transceiver 108 is a Bluetooth Low Energy (BLE) transceiver capable of bidirectional wireless communication with the remote device 120 via one or more Bluetooth channels. But, in other examples, the transceiver 108 may be a different type of transceiver capable of communicating with the remote device 120 using another wireless protocol, such as the IEEE 802.11 protocol, the IEEE 802.15.4 protocol, etc.

Since keeping the transceiver 108 turned on and listening all the time can consume a large amount of power, as discussed above, the wireless device 102 also includes a first wake-up receiver 104a and a second wake-up receiver 104b. The first wake-up receiver 104a and the second wake-up receiver 104b can sequentially or concurrently monitor multiple wireless channels for a pattern of wake-up signals and activate the transceiver 108 in response to detecting the pattern of wake-up signals.

In the example shown in FIG. 1, the first wake-up receiver 104a is electrically coupled to a switching circuit 106, through which the first wake-up receiver 104a can activate the second wake-up receiver 104b in response to detecting a first wake-up signal on a first wireless channel. For example, the first wake-up receiver 104a can transmit a first activation signal to the switching circuit 106, which can receive the first activation signal and responsively apply power from a power source 110 to the second wake-up receiver 104b to activate the second wake-up receiver 104b. But in other examples, the first wake-up receiver 104a can be electrically coupled to the second wake-up receiver 104b, as indicated by the dashed line between the first wake-up receiver 104a and the second wake-up receiver 104b. This may enable the first wake-up receiver 104a to transmit the first activation signal to (e.g., directly to) the second wake-up receiver 104b, thereby activating the second wake-up receiver 104b.

Similarly, in the example shown in FIG. 1, the second wake-up receiver 104b is electrically coupled to the switching circuit 106, through which the second wake-up receiver 104b can activate the transceiver 108 in response to detecting a second wake-up signal on a second wireless channel. For example, the second wake-up receiver 104b can transmit a second activation signal to the switching circuit 106, which can be configured to receive the second activation signal and responsively apply power from the power source 110 to the transceiver 108 in order to activate the transceiver 108. But in other examples, the second wake-up receiver 104b can be electrically coupled to the transceiver 108, as indicated by the dashed line between the second wake-up receiver 104b and the transceiver 108. This may enable the second wake-up receiver 104b to transmit the second activation signal to (e.g., directly to) the transceiver 108, thereby activating the transceiver 108.

The switching circuit 106 includes one or more switching components 114. Examples of the switching components 114 can include transistors, logic gates (e.g., AND, OR, NAND, or NOR gates), relays, switches, or any combination of these. For example, an output of the first and second wake-up receivers may be provided as inputs to an AND or NAND gate to activate the transceiver, e.g., by pulling an "active" or "reset" line to an appropriate level. In some examples, an output of the first wake-up receiver may also (or instead) activate a gate, such as a NOR gate, to activate the second wake-up receiver. The output of the second wake-up receiver may then be used, by itself or in conjunction with the first wake-up receiver, to activate the transceiver. The switching circuit 106 is configured to activate the transceiver 108 based on a first activation signal from the first wake-up receiver 104a and a second activation signal from the second wake-up receiver 104b. For example, the switching circuit 106 can receive a first activation signal from the first wake-up receiver 104a and responsively activate the second wake-up receiver 104b. After activating the second wake-up receiver 104b, the switching circuit 106 can receive a second activation signal from the second wake-up receiver 104b and responsively activate the transceiver 108.

In some examples, the switching circuit 106 includes a processing device 112. Examples of the processing device 112 include a microprocessor, a digital signal processor (DSP), an application-specific integrated circuit (ASIC), one or more field programmable gate arrays (FPGAs), or state machines. Other examples of the processing device 112 include programmable electronic devices such as a PLC, a programmable interrupt controller (PIC), a programmable logic device (PLD), a programmable read-only memory (PROM), or an electronically programmable read-only memory (EPROM or EEPROM). The processing device 112 can execute program code stored on a memory device (e.g., a non-transitory computer-readable medium) to implement various functionality. The program code can include processor-specific instructions generated by a compiler or an interpreter from code written in any suitable computer-programming language, such as C, C++, C#, etc.

As one particular example, the processing device 112 can execute program code to activate the transceiver 108 based on a first activation signal from the first wake-up receiver 104a and a second activation signal from the second wake-up receiver 104b. For instance, the processing device 112 can receive the first activation signal from the first wake-up receiver 104a and responsively activate the second wake-up receiver 104b by activating an "enable" or "reset" line input or by switching on power to the second wake-up receiver 104b. Subsequent to activating the second wake-up receiver 104b, the processing device 112 can receive the second activation signal from the second wake-up receiver 104b and responsively activate the transceiver 108.

The first wake-up receiver 104a and the second wake-up receiver 104b can each include any type of wake-up receiver. Examples of various types of wake-up receivers are discussed in greater detail below with reference to FIGS. 2-5.

Figure 2:
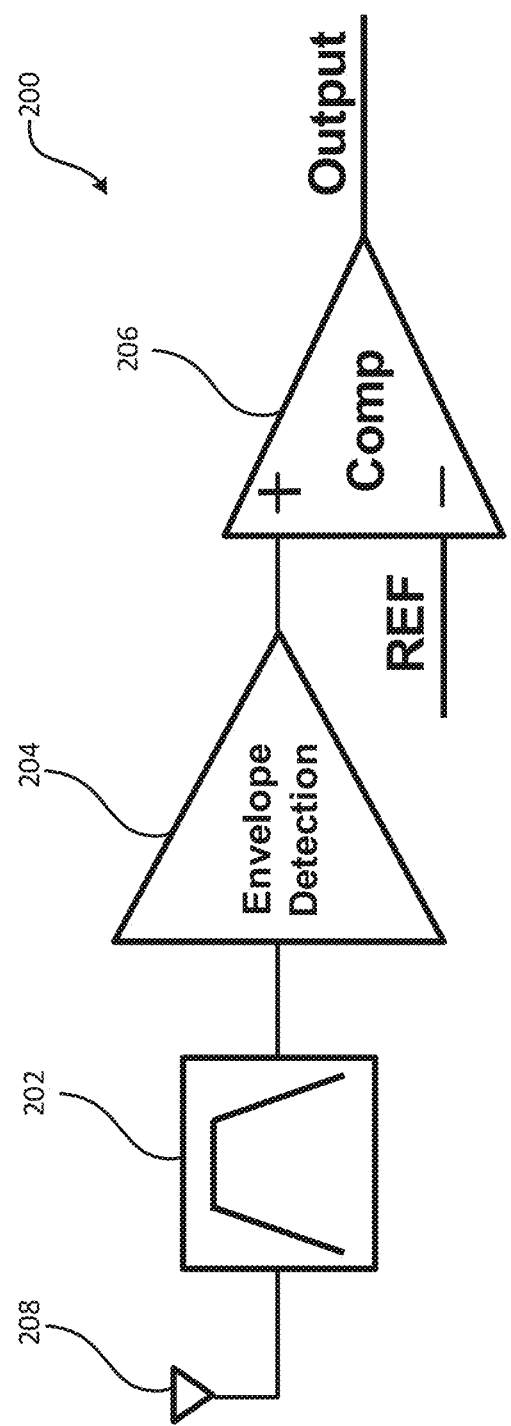
FIG. 2 is a schematic diagram of an example of a wake-up receiver according to some aspects.

One example of a wake-up receiver 200 is shown in FIG. 2. The wake-up receiver 200 is configured to perform envelope detection on incoming wireless signals to identify a wake-up signal having a predefined envelope shape. The wake-up receiver 200 includes an antenna 208 electrically coupled to a bandpass filter 202, which can filter out wireless signals outside of a designated frequency band (e.g., outside a designated wireless channel) to produce a filtered signal. The bandpass filter 202 is electrically coupled to an envelope detector 204. The envelope detector 204 is configured to receive the filtered signal as input from the bandpass filter 202 and provide the envelope of the filtered signal as output. Any suitable envelope detection circuit may be employed as the envelope detector, e.g., a precision rectifier in conjunction with low pass filter. The envelope detector 204 is electrically coupled to a comparator 206, which is configured to compare the envelope of the filtered signal to a reference voltage, designated as "REF" in FIG. 2. If the envelope of the filtered signal meets or exceeds the reference voltage, the comparator 206 can output a HIGH signal (e.g., 5 volts). This can serve as an activation signal, such as the first activation signal or the second activation signal. If the envelope of the filtered signal does not exceed the reference value, the comparator 206 can output a LOW signal (e.g., 0 volts).

Figure 3:
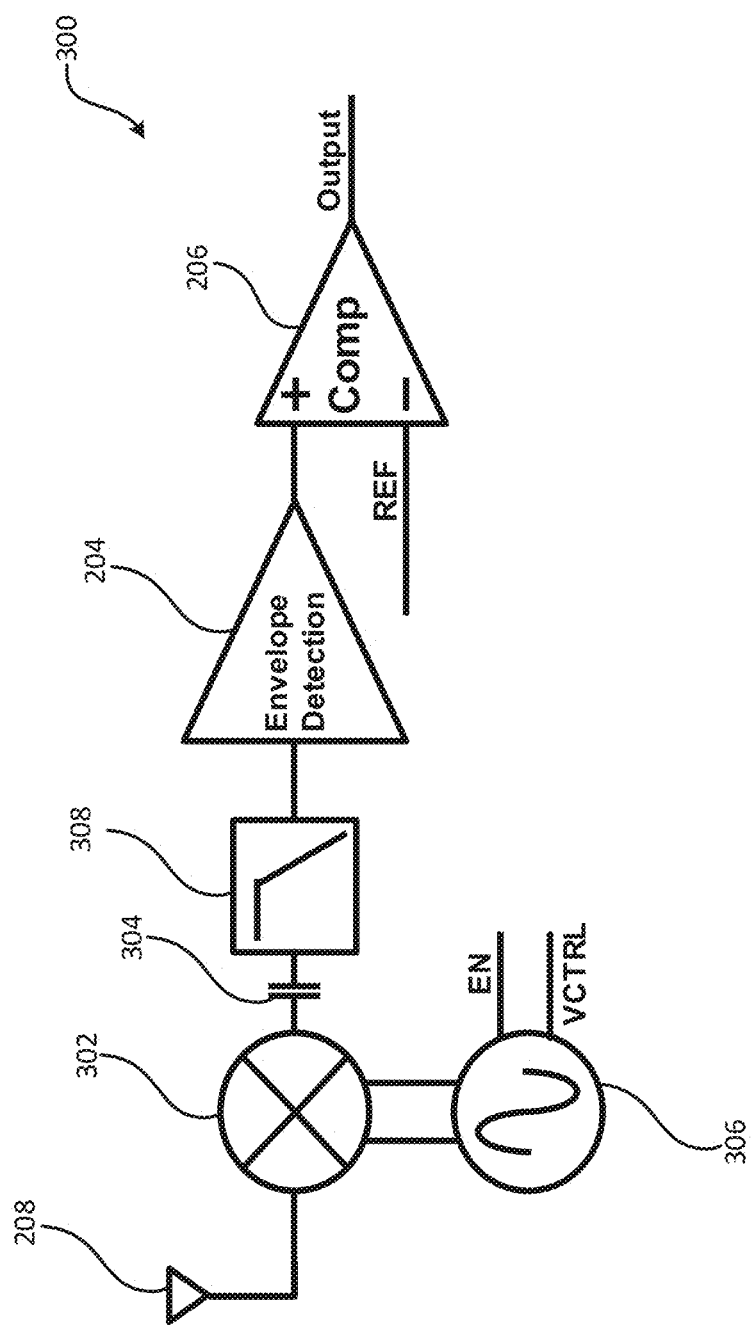
FIG. 3 is a schematic diagram of an example of a wake-up receiver according to some aspects.

Another example of a wake-up receiver 300 is shown in FIG. 3. The wake-up receiver 300 is also configured to perform envelope detection on incoming wireless signals to identify a wake-up signal having a predefined envelope shape. This example includes the antenna 208, envelope detector 204, and comparator 206 of FIG. 2, but also includes additional components.

Specifically, the wake-up receiver 300 also includes a mixer 302, such as a frequency mixer. The mixer 302 is configured to modulate the frequency of an analog signal transmitted from the antenna 208. The mixer 302 modulates the frequency of the analog signal based on an output from a local oscillator 306, thereby producing a frequency-modulated signal. The local oscillator 306 can be controlled by a first activation signal (VCTRL) that adjusts the oscillation frequency of the local oscillator 306, and a second activation signal (EN) generated by a timer. The timer can be configured to operate the wake-up receiver 300 with a low duty-cycle (e.g., less than 1%), thereby further saving power.

After generating the frequency-modulated signal, the mixer 302 can transmit the frequency-modulated signal to a capacitor 304. The capacitor 304 removes direct current (DC) offset from the frequency-modulated signal, and transmits the remaining alternating current (AC) signal to a low-pass filter 308. The low-pass filter 308 removes frequencies that are above a predefined frequency threshold from the AC signal to produce a filtered signal. The remainder of the circuit can operate as discussed above with reference to FIG. 2.

Figure 4:
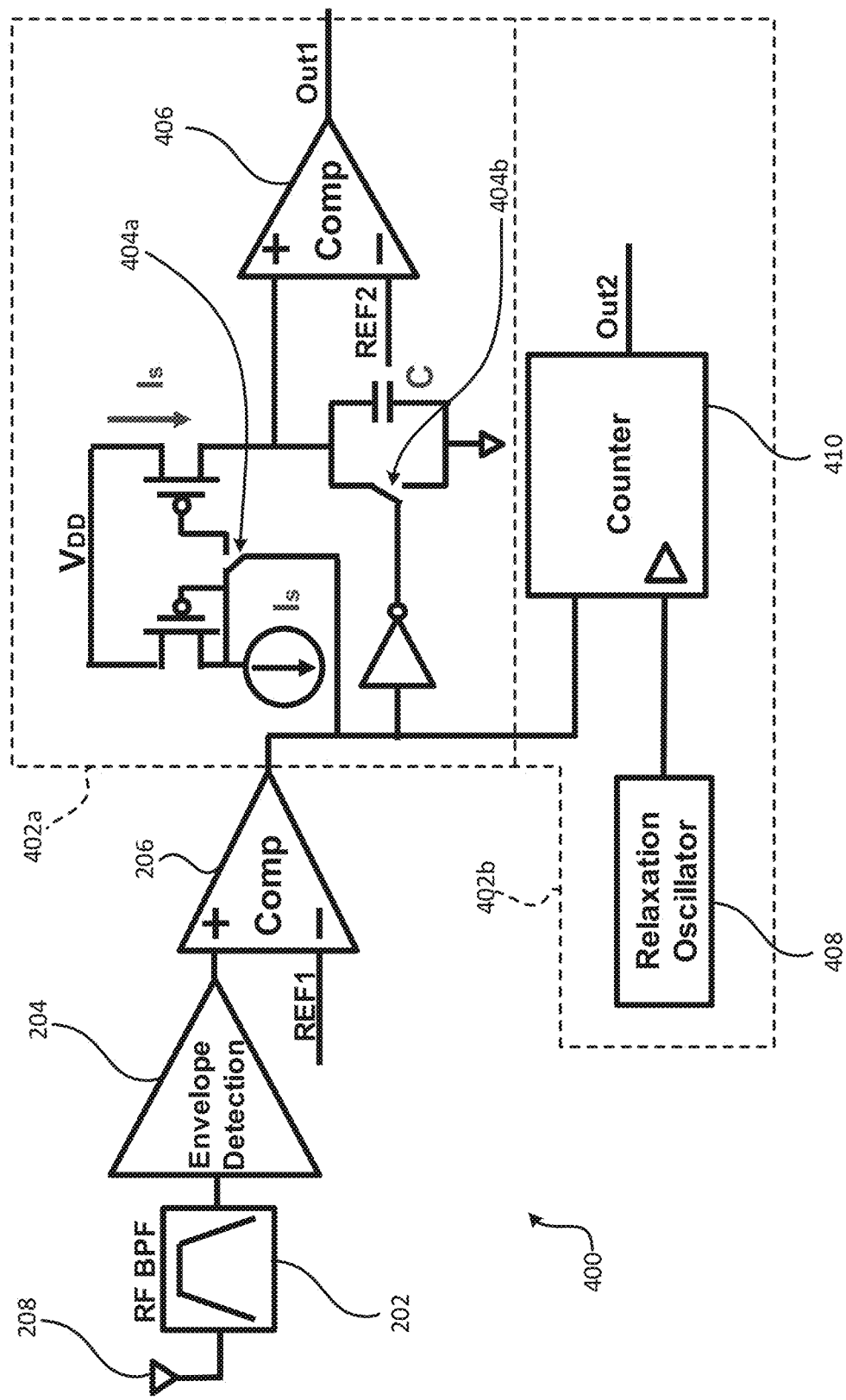
FIG. 4 is a schematic diagram of an example of a wake-up receiver according to some aspects.

Another example of a wake-up receiver 400 is shown in FIG. 4. The wake-up receiver 400 is configured to detect the envelope shape and the time duration of incoming wireless signals to identify a wake-up signal having both a particular envelope shape and a particular time duration. The left half of the wake-up receiver 400 can include the antenna 208, bandpass filter 202, envelope detector 204, and comparator 206 of FIG. 2. The wake-up receiver 400 can also include a time-domain filter 402a-b, as shown in a dashed box and discussed below.

The upper half 402a of the time-domain filter 402a-b can generally form an integrator circuit. Since integrator circuits are mostly (or entirely) passive, they consume relatively little power. The integrator circuit is configured to detect a time duration of an incoming wireless signal and set a first output (Out1) to either a HIGH state if the time duration exceeds a predefined minimum duration or a LOW state if the time duration does not exceed the predefined minimum duration. One example of the predefined minimum duration can be 1 millisecond.

More specifically, the upper half 402a of the time-domain filter 402 includes a first switch 404a and a second switch 404b. When wake-up receiver 400 is receiving a wireless signal such that the output from the comparator 206 is HIGH, the first switch 404a will be in a closed state and the second switch 404b will be in an open state. As a result, the current (Is) will charge the capacitor (C) with at the rate (Is*t/C), where t is time. The comparator 406 will repeatedly compare the capacitor's charge with a reference voltage (REF2). If the duration of the wireless signal is less than the predefined minimum duration, the reference voltage will exceed the capacitor's charge and the first output will be in a LOW state. If the duration of the wireless signal exceeds the predefined minimum duration, the capacitor's charge will exceed the reference voltage and the first output will switch to a HIGH state. At a later point in time, the output from the comparator 206 can switch to LOW. This causes the first switch 404a to open and the second switch 404b to close. With the second switch 404b closed, the capacitor (C) dissipates its charge and the first output will switch back to the LOW state. In some examples, the first output serves as an activation signal, such as the first activation signal or the second activation signal. And the activation signal will only be HIGH if incoming wireless signal has both the correct envelope shape and a time duration that exceeds the predefined minimum duration.

The time-domain filter 402a-b can additionally or alternatively include the circuit components shown in the lower half 402b of FIG. 4. The lower half 402b includes a relaxation oscillator 408. The relaxation oscillator 408 is a nonlinear electronic oscillator that produces a non-sinusoidal repetitive clock signal, such as a triangular wave or a square wave. The relaxation oscillator 408 is electrically coupled to a counter 410 for transmitting the clock signal to the counter 410. The counter 410 can receive the clock signal and count the number of clock transitions that occur in the clock signal within a given timeframe. Since the counter 410 is an active component that is more accurate than an integrator circuit, the counter 410 also consumes more power than the integrator circuit.

The relaxation oscillator 408 and the counter 410 can work together to detect the time duration of an incoming wireless signal. For example, when wake-up receiver 400 is receiving a wireless signal such that the output from the comparator 206 is HIGH, the relaxation oscillator 408 can transmit a clock signal to the counter 410. The counter 410 can count the number of clock transitions occurring during this timeframe and compare the number of clock transitions to a preset value. If the number of clock transitions occurring during this timeframe is less than the preset value, the counter 410 can set a second output (Out2) to a HIGH state, which may indicate that the time duration of the incoming wireless signal is less than a predefined maximum duration (e.g., 3 milliseconds). Otherwise, the counter 410 can set the second output to a LOW state, which may indicate that the time duration of the incoming wireless signal is more than the predefined maximum duration (e.g., 3 milliseconds).

In some examples, the second output (Out2) can serve as an activation signal. And the activation signal will only be HIGH if incoming wireless signal has both the correct envelope shape and a time duration that is less than the predefined maximum duration as detected by the counter 410.

In some examples, the first output from the comparator 406 and the second output from the counter 410 can both be used to determine an activation signal. For example, the first output and the second output can be provided as inputs to an AND gate, which can produce a third output based on the first output and the second output. The third output can serve as the activation signal. In such an example, the AND gate will only send the activation signal if an incoming wireless signal has both the correct envelope shape and a time duration between the predefined minimum duration and the predefined maximum duration (e.g., the wireless signal has a specific pulse width).

The example shown in FIG. 4 can be modified in numerous ways. For example, the upper half 402a of the time-domain filter 402a-b can be replaced with another type of integrator circuit. As another example, the wake-up receiver 400 can exclude the envelope detection circuitry (e.g., envelope detector 204 and comparator 206), such that the wake-up receiver 400 is only configured to detect the time duration of an incoming wireless signal and trigger the activation signal accordingly. As another example, the upper half 402a of the time-domain filter 402a-b can be excluded from the wake-up receiver 400, and the lower half 402b of the time-domain filter 402a-b can perform the functionality of both halves. For instance, the lower half 402b of the time-domain filter 402a-b can determine that an incoming wireless signal lasted for a preset number of clock transitions corresponding to a particular timespan (e.g., 400 microseconds) and responsively transmit an activation signal. Any number and combination of modifications can be made.

Figure 5:
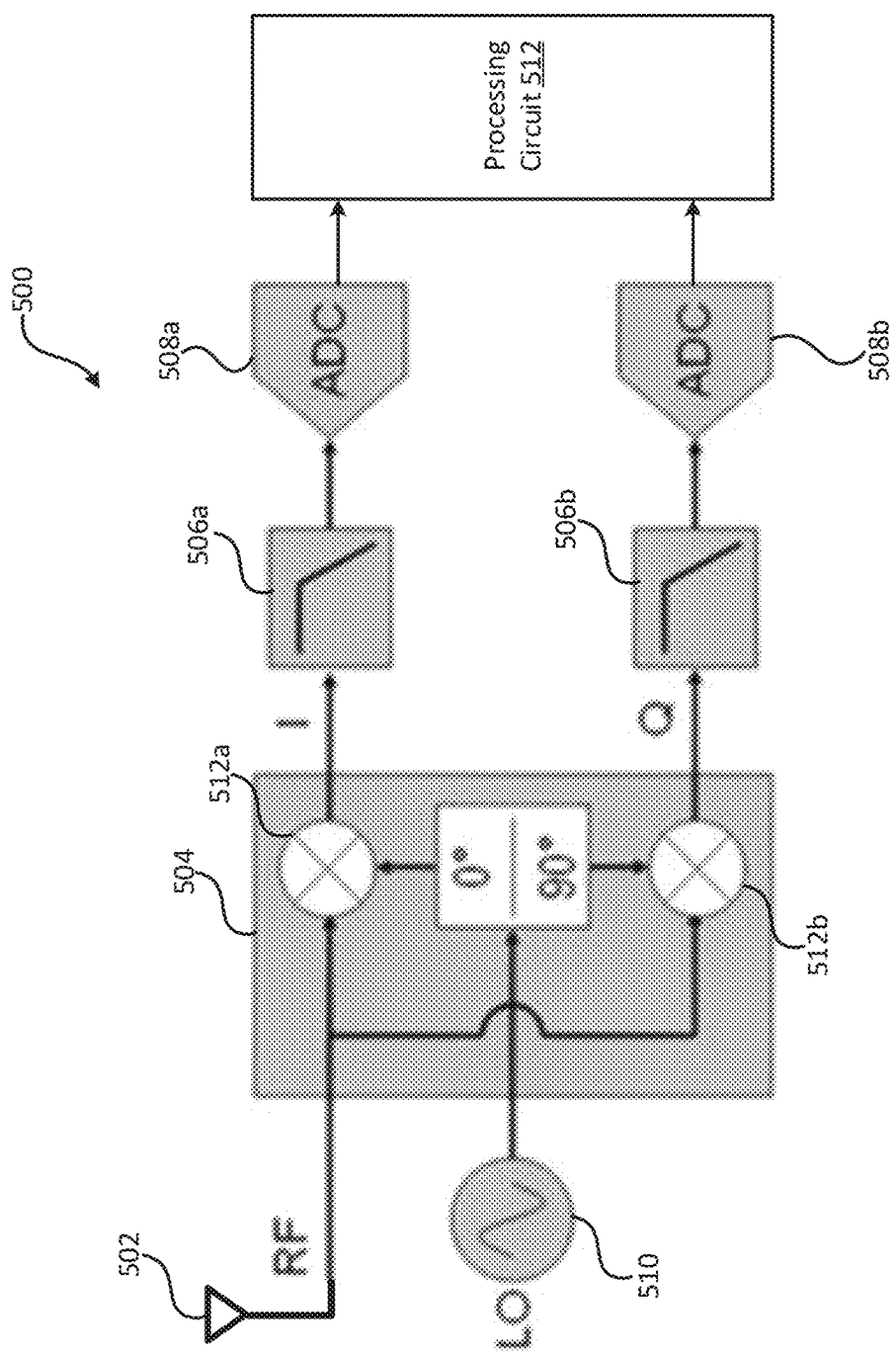
FIG. 5 is a schematic diagram of an example of a wake-up receiver according to some aspects.

Another example of a wake-up receiver 500 is shown in FIG. 5. The wake-up receiver 500 is configured to perform I/Q demodulation on incoming wireless signals to identify a wake-up signal carrying certain packet data. Since this process is more complex and can require more power than detecting high-level waveform characteristics (e.g., envelope shape, amplitude, frequency, and time duration) of a wireless signal, the wake-up receiver 500 can consume more power than the wake-up receivers of FIGS. 2-4. For example, the wake-up receiver 500 may consume around 100 microwatts of power, which may be roughly 50 times as much power as the wake-up receivers discussed above. But this process is also more accurate and less susceptible to false positives, since the wake-up receiver 500 is analyzing packet data for predefined wake-up content.

More specifically, the wake-up receiver 500 includes an antenna 502 configured to generate an analog (e.g., radio frequency) signal based on a received wireless signal. The antenna 502 is electrically coupled to quadrature demodulation circuitry 504 for transmitting the analog signal to the quadrature demodulation circuitry 504. The quadrature demodulation circuitry 504 is configured to receive the analog signal from the antenna 502 as well as an oscillator signal from an oscillator 510. Examples of the oscillator 510 can be an inductor-capacitor (LC) oscillator and a phase-locked loop oscillator. The quadrature demodulation circuitry 504 can include mixer 512a configured to multiply the analog signal by the oscillator signal to generate a first baseband signal on the "I channel." And the quadrature demodulation circuitry 504 can include mixer 512b configured to multiply the analog signal by the oscillator signal as phase shifted by 90° to generate a second baseband signal on the "Q channel." The first and second baseband signals are then filtered by respective low-pass filters 506a-b to suppress undesirable high-frequency content, and transmitted to respective analog-to-digital converters (ADCs) 508a-b to convert the first and second baseband signals into digital data.

In some examples, the ADCs 508a-b can be electrically coupled to (or part of) a processing circuit 512, which can analyze the digital data for predefined wake-up content. If the processing circuit 512 detects that the digital data includes the predefined wake-up content, the processing circuit 512 can transmit an activation signal, such as the first activation signal or the second activation signal. In some examples, the processing circuit 512 can be similar to (or can actually be) the processing device 112 of FIG. 1. For example, the processing device 112 can include a CPU, a microcontroller, a FPGA, an ASIC, or any combination of these.

Now referring back to FIG. 1, in some examples, the first and second wake-up receivers 104a-b are cascaded such that the first wake-up receiver 104a activates the second wake-up receiver 104b after the first wake-up receiver 104a detects one or more wake-up signals. In such an example, the first wake-up receiver 104a will be turned on for a longer time period than the second wake-up receiver 104b. So, the first wake-up receiver 104a can have limited functionality such that it merely detects high-level waveform characteristics (e.g., envelope shape, amplitude, frequency, and/or time duration) of incoming wireless signals to reduce its power consumption. And since the second wake-up receiver 104b will be turned on for a shorter time period than the first wake-up receiver 104a, the second wake-up receiver 104b can have more complex functionality. For example, the second wake-up receiver 104b can perform digital data analysis (e.g., analyze the digital data carried by incoming wireless signals), which is more accurate but consumes more power.

Cascading the first and second wake-up receivers 104a-b in the above manner yields benefits that each of the wake-up receivers 104a-b is incapable of providing on its own. For example, this combination reduces "false positives" by using two wake-up receivers to detect sequential wake-up signals (e.g., on multiple wireless channels) via different detection methods before activating the transceiver 108. This combination also retains the increased accuracy afforded by digital data analysis without having the second wake-up receiver 104b turned on all the time, thereby balancing accuracy and power consumption. The net result can be an interference resistant, highly sensitive, ultra-low power wake-up system for the transceiver 108.

In some examples, the first wake-up receiver 104a and/or second wake-up receiver 104 can be duty cycled to further reduce power consumption. For example, the first wake-up receiver 104a can be duty cycled at a predefined rate, such as 0.1% (e.g., the first wake-up receiver 104a is active for 10 µS every 10,000 µS). This can involve configuring the first wake-up receiver 104a to automatically switch itself between a deactivated state and an activated state at the predefined rate.

While FIG. 1 depicts a first wake-up receiver 104a configured to detect a first wake-up signal on a first wireless channel and a second wake-up receiver 104b configured to detect a second wake-up signal on a second wireless channel, the wireless device 102 can include any number and combination of wake-up receivers configured to detect, sequentially or concurrently, any number and combination of wake-up signals on any number and combination of wireless channels. One example of a process for monitoring multiple wireless channels for multiple wake-up signals is discussed below with reference to FIG. 6.

Figure 6:
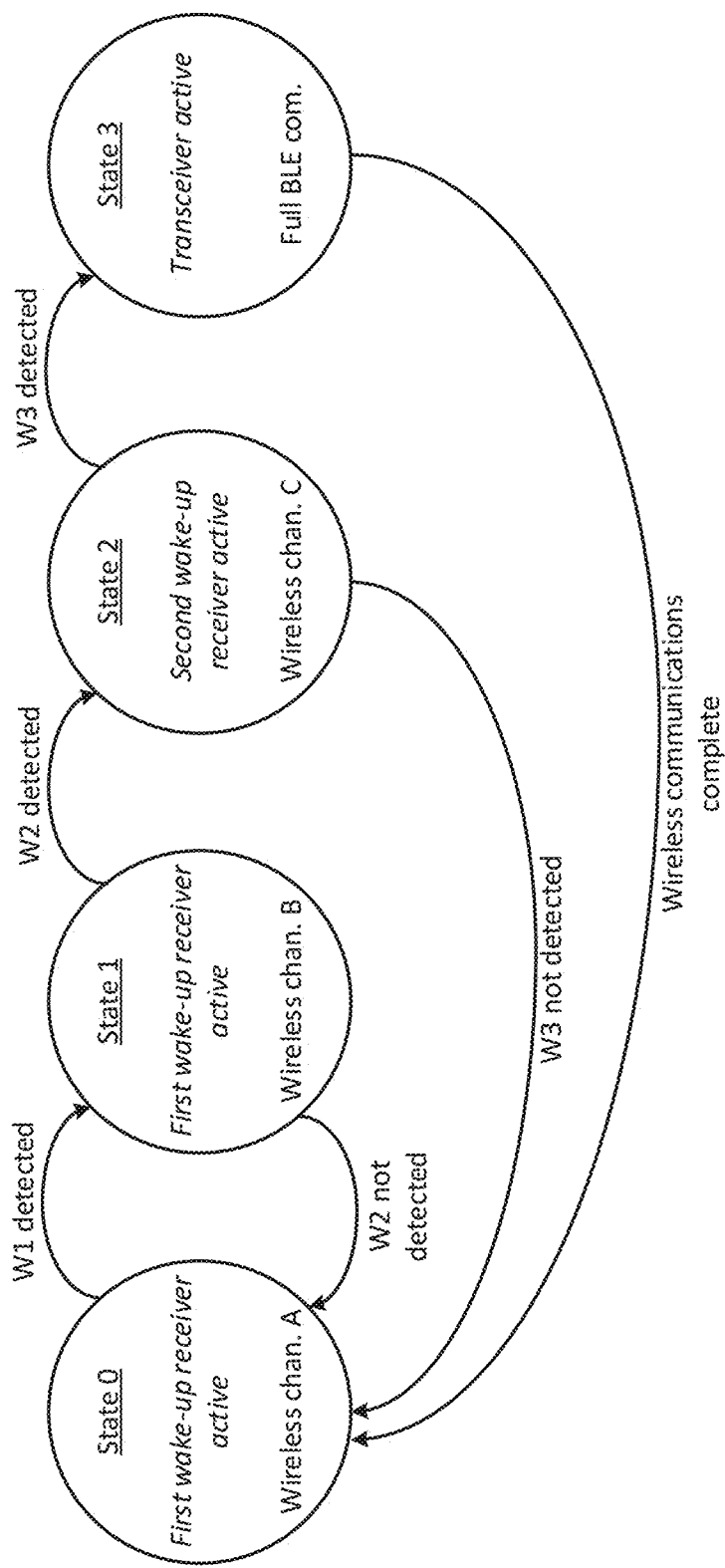
FIG. 6 is a state diagram of an example of a process for monitoring multiple wireless channels for multiple wake-up signals according to some aspects.

FIG. 6 is a state diagram of an example of a process for monitoring multiple wireless channels for multiple wake-up signals according to some aspects. Other examples can include more steps, fewer steps, different steps, or a different combination of steps than are shown in FIG. 6. The steps of FIG. 6 are discussed below with reference to the components discussed above in relation to FIG. 1.

The state diagram begins with the wireless device 102 in State 0, in which the first wake-up receiver 104a is monitoring a first wireless channel (e.g., "Wireless Chan. A") to detect a first wake-up signal (W1). Upon detecting the first wake-up signal, the first wake-up receiver 104a can automatically switch from monitoring the first wireless channel to monitoring a second wireless channel (e.g., "Wireless Chan. B") in order to detect a second wake-up signal (W2) on the second wireless channel, thereby causing the wireless device 102 to enter State 1. If the first wake-up receiver 104a does not detect the second wake-up signal on the second wireless channel within a first preset time-period, the first wake-up receiver 104a can automatically switch back to monitoring the first wireless channel, thereby causing the wireless device 102 to revert back to State 0. Otherwise, the first wake-up receiver 104a can activate the second wake-up receiver 104b, thereby causing the wireless device 102 to enter State 2. At this point, the wireless device 102 may or may not deactivate the first wake-up receiver 104a.

When the wireless device 102 is in State 2, the second wake-up receiver 104b can monitor a third wireless channel (e.g., "Wireless Chan. C") to detect a third wake-up signal (W3). If the second wake-up receiver 104b does not detect the third wake-up signal within a second preset time-period (which can be the same as or different from the first preset time-period), the wireless device 102 can revert back to State 0. For example, the wireless device 102 can deactivate the second wake-up receiver 104b and activate the first wake-up receiver 104a. If the second wake-up receiver 104b detects the third wake-up signal within the second preset time-period, the second wake-up receiver 104b can activate the transceiver 108, thereby causing the wireless device 102 to enter State 3. At this point, the wireless device 102 may or may not deactivate the second wake-up receiver 104b.

When the wireless device 102 is in State 3, the wireless device 102 can engage in full BLE wireless communications with the remote device 120 using the transceiver 108. For example, the wireless device 102 can engage in bidirectional BLE data communications with the transceiver 108. Once finished, the wireless device 102 can revert back to State 0. For example, the wireless device 102 can deactivate the transceiver 108 and re-activate the first wake-up receiver 104a.

It should be appreciated that in some examples, the first wake-up receiver 104a may only detect one wake-up signal before activating the second wake-up receiver 104b. Thus, in some examples, State 1 may be eliminated and the wireless device 102 may transition to State 2 when the first wake-up receiver detects wake-up signal W1. Still further variations may be employed as well.

In some examples, one or more of the wireless channels are Bluetooth advertising channels. More specifically, the Bluetooth spectrum is divided into 40 wireless channels in the 2.4 gigahertz (GHz) band, whereby each wireless channel is separated by 2 megahertz (MHz). Three of these 40 wireless channels are dedicated to advertisement transmissions, while the other 37 wireless channels are dedicated to data transmissions. The three wireless channels dedicated to advertisement transmissions are channels 37, 38, and 39, and can be referred to as "advertising channels." The wake-up receivers 104a-b can monitor the advertising channels to detect a sequence of advertisement signals transmitted by the remote device 120, whereby the advertisement signals can serve as the wake-up signals. For example, when the wireless device 102 is in State 0, the first wake-up receiver 104a can monitor Bluetooth channel 37 to detect a first wake-up signal comprising a first Bluetooth advertisement signal. When the wireless device 102 is in State 1, the first wake-up receiver 104a can monitor Bluetooth channel 38 to detect a second wake-up signal comprising a second Bluetooth advertisement signal. When the wireless device 102 is in State 2, the second wake-up receiver 104b can monitor Bluetooth channel 39 to detect a third wake-up signal comprising a third Bluetooth advertisement signal.

Figure 7:
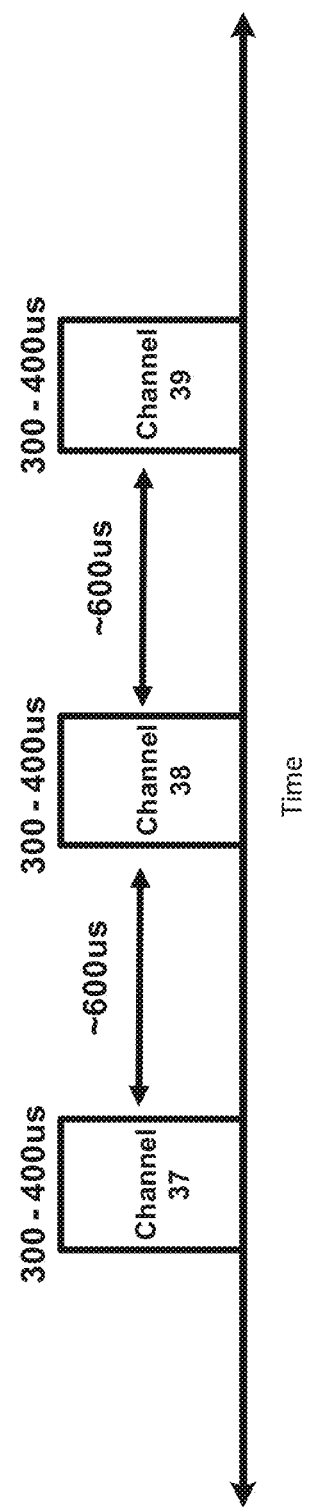
FIG. 7 is a graph depicting examples of wake-up signals according to some aspects.

One example of such a sequence of wake-up signals is shown in FIG. 7. As shown, the wake-up signals can include 300-400 µS pulses that are sequentially transmitted on Bluetooth channels 37, 38, and 39. There can be a 600 µS pause between each pulse. This pause can be referred to as an "advertising interval." But other examples can involve any number and combination of wake-up signals, formed from any sequence of pulses with any combination of pulse characteristics, on any combination of wireless channels.

The above principles can also be employed in examples in which the wireless device 102 only has one wake-up receiver configured to wake up the transceiver 108. More specifically, the wireless device 102 can have a single wake-up receiver configured to monitor any number and combination of channels for any number and combination of wake-up signals having any number and combination of characteristics (e.g., amplitudes, frequencies, pulse widths, phases, envelope shapes, durations, duty cycles, and/or advertising intervals). For example, the wake-up receiver can monitor an advertising channel for a wake-up signal comprising a train of pulses having a particular advertising interval, such as 20 milliseconds. As another example, advertising signals are typically transmitted in a certain order on the advertising channels, such as a pulse on Bluetooth channel 37, followed by another pulse on Bluetooth channel 38, followed by another pulse Bluetooth channel 39. So, the wireless device 102 can monitor the advertising channels for a wake-up signal comprising an atypical sequence of advertising signals, such as a pulse on Bluetooth channel 37, followed by a pulse on Bluetooth channel 39, followed by a pulse on Bluetooth channel 38. This can minimize false wake-ups. As yet another example, the wake-up receiver can monitor an advertising channel for a wake-up signal comprising an amplitude that exceeds a threshold amplitude level. This may indicate that whichever remote device transmitted the advertising signal is proximate to (e.g., within 150 millimeters of) the wireless device 102 and therefore likely a target remote device.

Figure 8:
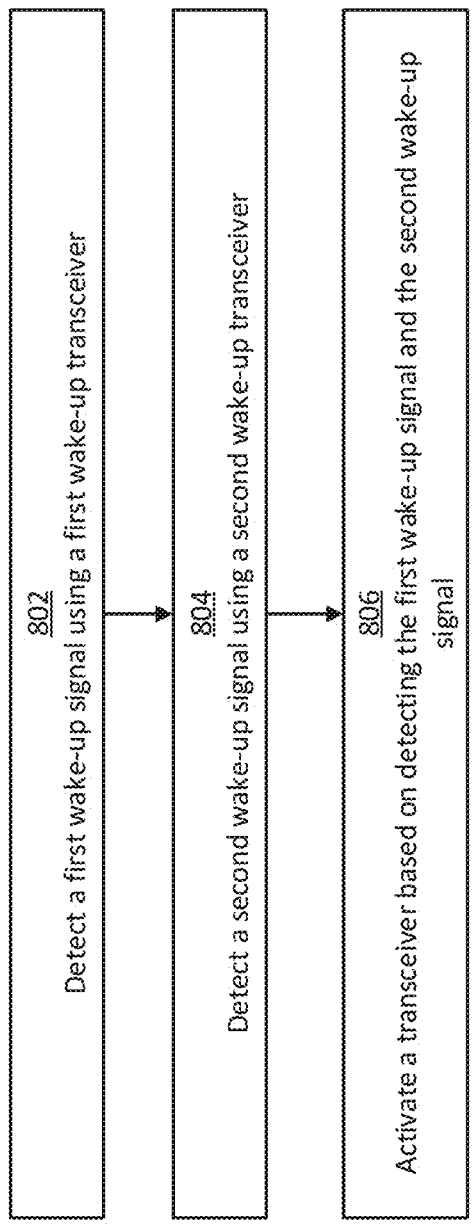
FIG. 8 is a flow chart of an example of a process for monitoring multiple wireless channels for multiple wake-up signals according to some aspects.

FIG. 8 is a flow chart of another example of a process for waking up a transceiver according to some aspects. Other examples can include more steps, fewer steps, different steps, or a different combination of steps than are shown in FIG. 8. The steps of FIG. 8 are discussed below with reference to the components discussed above in relation to FIG. 1.

In block 802, the wireless device 102 detects a first wake-up signal using a first wake-up receiver 104a. In some examples, the first wake-up receiver 104a is configured to detect the first wake-up signal using envelope detection, time-domain filtering, digital-data analysis, or a combination of these. The first wake-up signal can be Bluetooth advertisement signal detected on a Bluetooth advertisement channel, or another type of wireless signal detected on another wireless channel (e.g., another Bluetooth wireless channel).

The wireless device 102 can transmit a first activation signal in response to detecting the first wake-up signal. For example, the first wake-up receiver 104a can transmit the first activation signal to the switching circuit 106 in response to detecting the first wake-up signal. As another example, the first wake-up receiver 104a can transmit the first activation signal to the second wake-up receiver 104b in response to detecting the first wake-up signal.

In block 804, the wireless device 102 detects a second wake-up signal using a second wake-up receiver 104b. In some examples, the second wake-up receiver 104b is configured to detect the second wake-up signal using envelope detection, time-domain filtering, digital-data analysis, or a combination of these. The second wake-up signal can be Bluetooth advertisement signal detected on a Bluetooth advertisement channel, or another type of wireless signal detected on another wireless channel (e.g., another Bluetooth wireless channel).

The wireless device 102 can transmit a second activation signal in response to detecting the second wake-up signal. For example, the second wake-up receiver 104b can transmit the second activation signal to the switching circuit 106 in response to detecting the second wake-up signal. As another example, the second wake-up receiver 104a can transmit the second activation signal to the transceiver 108 in response to detecting the second wake-up signal.

In block 806, the wireless device 102 activates the transceiver 108 based on detecting the first wake-up signal and the second wake-up signal. In some examples, the switching circuit 106 receives the first activation signal from the first wake-up receiver 104a and the second activation signal from the second wake-up receiver 104b and responsively activates the transceiver 108. In an example in which the first and second wake-up receivers 104a-b are cascaded, the switching circuit 106 can receive the first activation signal from the first wake-up receiver 104a and responsively activate the second wake-up receiver 104b. Subsequent to activating the second wake-up receiver 104b, the switching circuit 106 can receive the second activation signal from the second wake-up receiver 104b and responsively activate the transceiver 108. In another example, both the wake-up receivers 104a-b can be active at the same time, and the switching circuit 106 can receive the first and second activation signals from the first and second wake-up receiver 104a-b concurrently. Based on receiving the first and second control signals concurrently, the switching circuit 106 can activate the transceiver 108.

Figure 9:
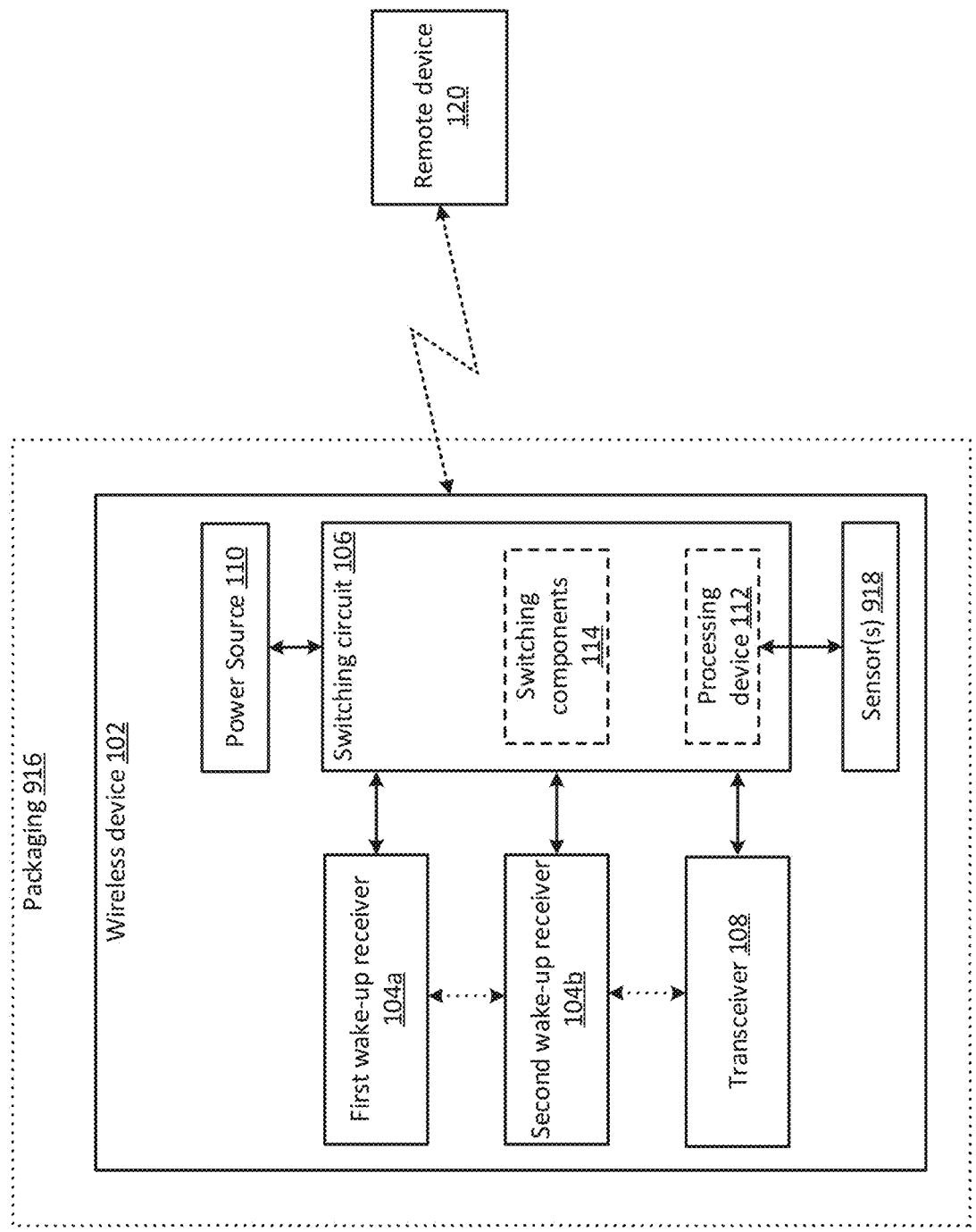
FIG. 9 is a block diagram of an example of a system for waking up a transceiver according to some aspects.

Referring now to FIG. 9, in some examples the wireless device 102 can be stored in packaging 916 for transport to prevent damage to the wireless device 102. In some such examples, the wireless device 102 can automatically detect when it has been removed from the packaging 916 via one or more sensors 918, such as magnets, buttons, magnetometers, switches, or any combination of these. If the wireless device 102 detects that it has been removed from the packaging 916, the wireless device 102 can cause the first wake-up receiver 104a and/or the second wake-up receiver 104b to switch from one sensitivity mode to another sensitivity mode.

As a particular example, the first wake-up receiver 104a and/or the second wake-up receiver 104b can have multiple sensitivity modes usable in different settings. One exemplary sensitivity mode can be a low sensitivity mode, in which the wake-up receiver is less susceptible to interference (e.g., is less sensitive) than in other modes. The first wake-up receiver 104a and/or the second wake-up receiver 104b can be set to the low sensitivity mode, for example, prior to the wireless device 102 being stored in the packaging 916 in order to prevent wireless signals from unnecessarily turning on the transceiver 108 when the wireless device 102 is not in use. Another exemplary sensitivity mode can be a medium sensitivity mode, in which the wake-up receiver is more susceptible to interference (e.g., is more sensitive) than the low sensitivity mode. The first wake-up receiver 104a and/or second wake-up receiver 104b can be set to the medium sensitivity mode, for example, while the wireless device 102 is at the manufacturer for testing. Another exemplary sensitivity mode can be a high sensitivity mode, in which the wake-up receiver is more susceptible to interference than the medium sensitivity mode. The first wake-up receiver 104a and/or second wake-up receiver 104b can be set to the high sensitivity mode, for example, once the wireless device 102 is removed from the packaging 916 for end use. In some examples, this may involve the wireless device 102 automatically detecting that it has been removed from the packaging 916 via the sensors 918 and, in response, transmitting one or more mode-switching signals to the first wake-up receiver 104*a* and/or the second wake-up receiver 104*b* to cause them to switch into the high sensitivity mode.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any example(s) described herein can be combined with any other example(s).

The invention claimed is:

1. A system comprising:
   a first wake-up receiver configured to:
   receive a first plurality of wireless signals,
   detect a first wake-up signal among the first plurality of wireless signals, and
   in response to detecting the first wake-up signal among the first plurality of wireless signals, transmit a first activation signal configured to cause a second wake-up receiver to become activated;
   the second wake-up receiver, wherein the second wake-up receiver is configured to switch from a deactivated state to an activated state as a result of the first wake-up transceiver transmitting the first activation signal and responsively:
   receive a second plurality of wireless signals,
   detect a second wake-up signal among the second plurality of wireless signals, and
   in response to detecting the second wake-up signal among the second plurality of wireless signals, transmit a second activation signal configured to cause a transceiver to become activated; and
   the transceiver, wherein the transceiver is configured to switch from a deactivated state to an activated state as a result of the second wake-up receiver transmitting the second activation signal and responsively engage in bidirectional communications with a remote device.

2. The system of claim 1, wherein:
   the first wake-up receiver is configured to transmit the first activation signal to a processing device, the processing device being configured to receive the first activation signal and responsively activate the second wake-up receiver; and
   the second wake-up receiver is configured to transmit the second activation signal to the processing device, the processing device being configured to receive the second activation signal and responsively activate the transceiver.

3. The system of claim 1, wherein the first wake-up receiver is configured to:
   detect the first wake-up signal on a first wireless channel;
   detect a third wake-up signal on a second wireless channel that is different from the first wireless channel; and
   in response to detecting the third wake-up signal on the second wireless channel, transmit the first activation signal configured to cause the second wake-up receiver to become activated.

4. The system of claim 3, wherein the first wake-up receiver is configured to:
   monitor the first wireless channel for the first wake-up signal;
   detect the first wake-up signal on the first wireless channel; and
   in response to detecting the first wake-up signal on the first wireless channel:
   stop monitoring the first wireless channel for the first wake-up signal and start monitoring the second wireless channel for the third wake-up signal;
   detect the third wake-up signal on the second wireless channel; and
   in response to detecting that the third wake-up signal on the second wireless channel, stop monitoring the second wireless channel and transmit the first activation signal.

5. The system of claim 3, wherein the first wireless channel is Bluetooth channel 37 and the second wireless channel is Bluetooth channel 38.

6. The system of claim 3, wherein the first wake-up signal is a first Bluetooth advertisement signal and the third wake-up signal is a second Bluetooth advertisement signal.

7. The system of claim 3, wherein the second wake-up receiver is configured to detect the second wake-up signal on a third wireless channel that is different from the first wireless channel and the second wireless channel.

8. The system of claim 7, wherein the third wireless channel is Bluetooth channel 39, and wherein the second wake-up signal is a Bluetooth advertisement signal.

9. The system of claim 1, wherein the first wake-up receiver is configured to automatically switch between a deactivated state and an activated state at a predefined rate.

10. The system of claim 1, wherein the first wake-up receiver comprises an envelope detector, and wherein the first wake-up receiver is configured to:
    detect that an envelope of the first wake-up signal matches a predefined envelope shape using the envelope detector; and
    transmit the first activation signal based on detecting that the envelope of the first wake-up signal matches the predefined envelope shape.

11. The system of claim 10, wherein the first wake-up receiver further comprises a time-domain filter, and wherein the first wake-up receiver is configured to:
    detect that the first wake-up signal lasted for a particular time duration using the time-domain filter; and
    transmit the first activation signal based on detecting that both (i) the envelope of the first wake-up signal matches the predefined envelope shape and (ii) the first wake-up signal lasted for the particular time duration.

12. The system of claim 10, wherein the second wake-up receiver includes:
    quadrature demodulation circuitry configured to convert the second wake-up signal into I/Q baseband signals;
    analog-to-digital converters electrically coupled to the quadrature demodulation circuitry and configured to convert the I/Q baseband signals into digital data; and
    a processing circuit configured to transmit the second activation signal in response to detecting that the digital data includes predefined wake-up content.

13. The system of claim 1, wherein the first wake-up receiver and the second wake-up receiver are each only capable of receiving wireless signals and not transmitting wireless signals.

14. The system of claim 1, wherein:
    the first wake-up receiver is configured to transmit the first activation signal to a switching circuit, the switching circuit being configured to receive the first activation signal and responsively apply power from a power source to the second wake-up receiver to activate the second wake-up receiver; and
    the second wake-up receiver is configured to transmit the second activation signal to the switching circuit, the switching circuit being configured to receive the second activation signal and responsively apply power from the power source to the transceiver to activate the transceiver.

15. A wireless device comprising:
a first wake-up receiver configured to:
detect a first wake-up signal within a first plurality of wireless signals, and
in response to detecting the first wake-up signal among the first plurality of wireless signals, transmit a first activation signal configured to cause a second wake-up receiver to become activated; and
the second wake-up receiver, wherein the second wake-up receiver is configured to:
detect a second wake-up signal within a second plurality of wireless signals, and
in response to detecting the second wake-up signal among the second plurality of wireless signals, transmit a second activation signal configured to cause a transceiver to become activated.

16. The wireless device of claim 15, wherein the first wake-up signal includes a first wireless signal transmitted on a first wireless channel and a second wireless signal transmitted on a second wireless channel, wherein the second wireless channel is different from the first wireless channel.

17. The wireless device of claim 16, wherein the first wake-up receiver is configured to detect the second wireless signal on the second wireless channel subsequent to detecting the first wireless signal on the first wireless channel.

18. The wireless device of claim 17, wherein the second wake-up signal includes a third wireless signal transmitted on a third channel that is different from the first wireless channel and the second wireless channel, wherein the second wake-up receiver is configured to detect the third wireless signal subsequent to the first wake-up receiver detecting the first wireless signal on the first wireless channel and the second wireless signal on the second wireless channel.

19. The wireless device of claim 18, wherein the first wireless signal is a first Bluetooth advertisement signal, the second wireless signal is a second Bluetooth advertisement signal, and the third wireless signal is a third Bluetooth advertisement signal.

20. The wireless device of claim 15, wherein the first wake-up receiver comprises a time-domain filter, and wherein the first wake-up receiver is configured to:
detect that the first wake-up signal lasted for a particular time duration using the time-domain filter; and
transmit the first activation signal based on detecting that the first wake-up signal lasted for the particular time duration.

21. The wireless device of claim 15, wherein the first wake-up receiver and the second wake-up receiver are disposed in an implantable device configured to be implanted in a body part.

22. A method comprising:
detecting, by a wireless device, a first wake-up signal using a first wake-up receiver of the wireless device;
in response to detecting the first wake-up signal, activating, by the wireless device, a second wake-up receiver of the wireless device; and
subsequent to activating the second wake-up receiver of the wireless device:
detecting, by the wireless device, a second wake-up signal using the second wake-up receiver; and in response to detecting the second wake-up signal, activating, by the wireless device, a transceiver of the wireless device, wherein the transceiver is configured to engage in bidirectional communication with a remote device.

23. The method of claim 22, wherein the first wake-up signal includes a first wireless signal transmitted on a first wireless channel and a second wireless signal transmitted on a second wireless channel, wherein the second wireless channel is different from the first wireless channel.

24. The method of claim 23, wherein the first wake-up receiver detects the second wireless signal on the second wireless channel subsequent to detecting the first wireless signal on the first wireless channel.

25. The method of claim 24, wherein the second wake-up signal includes a third wireless signal transmitted on a third channel that is different from the first wireless channel and the second wireless channel, and further comprising:
detecting, by the second wake-up receiver, the third wireless signal subsequent to the first wake-up receiver detecting the first wireless signal on the first wireless channel and the second wireless signal on the second wireless channel.

26. The method of claim 25, wherein the first wireless signal is a first Bluetooth advertisement signal and the second wireless signal is a second Bluetooth advertisement signal.

27. The method of claim 22, wherein the first wake-up receiver comprises an envelope detector, and further comprising:
detecting, by the first wake-up receiver, that an envelope of the first wake-up signal matches a predefined envelope shape using the envelope detector; and
transmitting, by the first wake-up receiver, a first activation signal based on detecting that the envelope of the first wake-up signal matches the predefined envelope shape, the first activation signal being configured to cause the second wake-up receiver to be activated.

28. The method of claim 27, wherein the first wake-up receiver further comprises a time-domain filter, and further comprising:
detecting, by the first wake-up receiver, that the first wake-up signal lasted for a particular time duration using the time-domain filter; and
transmitting, by the first wake-up receiver, the first activation signal in response to detecting that both (i) the first wake-up signal lasted for the particular time duration and (ii) the envelope of the first wake-up signal matches the predefined envelope shape.

29. The method of claim 22, further comprising:
converting, by the second wake-up receiver, the second wake-up signal into I/Q baseband signals using quadrature demodulation circuitry;
converting, by the second wake-up receiver, the I/Q baseband signals into digital data using analog-to-digital converters electrically coupled to the quadrature demodulation circuitry; and
transmitting, by a processing circuit electrically coupled to the analog-to-digital converters, a second activation signal in response to detecting that the digital data includes predefined wake-up content, the second activation signal being configured to cause the transceiver to be activated.

* * * * *